(12) United States Patent
Liu et al.

(10) Patent No.: US 11,967,881 B1
(45) Date of Patent: Apr. 23, 2024

(54) MAGNETOMETRIC TRANSMISSION STRUCTURE AND AN OSCILLATING DEVICE WITH PRESSURE CHAMBER

(71) Applicants: DANXIAO INFORMATION TECHNOLOGY LTD., Guangdong (CN); Huizhou Dexinhe Industrial Co., Ltd., Huizhou (CN)

(72) Inventors: Dan Liu, Guangzhou (CN); Sanjun Tuo, Huizhou (CN)

(73) Assignees: DANXIAO INFORMATION TECH LTD., Guangdong (CN); HUIZHOU DEXINHE INDUSTRIAL CO., LTD., Huizhou (CN)

( * ) Notice: Subject to any disclaimer, the term of this patent is extended or adjusted under 35 U.S.C. 154(b) by 0 days.

(21) Appl. No.: 18/143,742

(22) Filed: May 5, 2023

(30) Foreign Application Priority Data

Feb. 28, 2023 (CN) .......................... 202320354509.0

(51) Int. Cl.
| | |
|---|---|
| *H02K 7/10* | (2006.01) |
| *H02K 7/18* | (2006.01) |
| *H02K 33/00* | (2006.01) |

(52) U.S. Cl.
CPC ............ *H02K 7/10* (2013.01); *H02K 7/1876* (2013.01); *H02K 33/00* (2013.01)

(58) Field of Classification Search
USPC ............................................... 310/20–25, 15
See application file for complete search history.

(56) References Cited

U.S. PATENT DOCUMENTS

| | | | | | |
|---|---|---|---|---|---|
| 2,331,501 | A | * | 10/1943 | Rand, Jr. ................. | B26B 19/26 30/43.91 |
| 2,773,306 | A | * | 12/1956 | Ranson .................... | B26B 19/28 310/154.25 |
| 4,428,117 | A | * | 1/1984 | Horii ..................... | B26B 19/386 30/43.7 |
| 5,306,183 | A | * | 4/1994 | Holt ....................... | H02K 21/14 440/6 |
| 5,632,087 | A | * | 5/1997 | Motohashi ............ | H02P 25/032 30/43.92 |
| 5,720,160 | A | * | 2/1998 | Traxler .................... | D01H 7/12 57/76 |
| 5,921,134 | A | * | 7/1999 | Shiba .................... | B26B 19/282 310/20 |
| 6,226,871 | B1 | * | 5/2001 | Eichhorn ................ | B26B 19/28 30/346.51 |

(Continued)

*Primary Examiner* — Maged M Almawri
(74) *Attorney, Agent, or Firm* — Holtz, Holtz & Volek PC

(57) ABSTRACT

A magnetometric transmission structure includes a driving unit and an oscillating unit. The driving unit includes a driving assembly and a transmission assembly. The transmission assembly includes a magnetic component and a connecting component. The magnetic component is arranged at a driving end of the driving assembly and is driven by the driving assembly to rotate, and the connecting component is arranged between the magnetic component and the driving assembly. The oscillating unit includes an oscillating assembly. The oscillating assembly includes a movable component and an oscillating component. The movable component is arranged at one side of the magnetic component, the oscillating component is arranged at the movable component, and the oscillating component being made of magnetic material.

9 Claims, 9 Drawing Sheets

(56) References Cited

U.S. PATENT DOCUMENTS

| | | | | |
|---|---|---|---|---|
| 6,991,217 B2* | 1/2006 | Shimizu | ............... | B26B 19/288 |
| | | | | 310/12.01 |
| 7,053,507 B2* | 5/2006 | Kobayashi | ............. | H02K 33/16 |
| | | | | 310/15 |
| 7,504,751 B2* | 3/2009 | Kraus | ................... | B26B 19/288 |
| | | | | 310/12.24 |
| 7,607,229 B2* | 10/2009 | Motohashi | ............ | B26B 19/288 |
| | | | | 30/44 |
| 7,965,000 B2* | 6/2011 | Komori | ................. | H02K 33/16 |
| | | | | 310/15 |
| 8,680,723 B2* | 3/2014 | Subramanian | ......... | H02K 33/06 |
| | | | | 310/12.01 |
| 8,720,069 B2* | 5/2014 | Iwashita | ............... | B26B 19/048 |
| | | | | 30/346.51 |
| 9,132,058 B2* | 9/2015 | Imboden | ................ | A61H 19/00 |
| 9,669,561 B2* | 6/2017 | Fitzpatrick | ........... | B26D 7/2635 |
| 11,077,013 B2 | 8/2021 | Liu | | |
| 11,581,828 B2* | 2/2023 | Haronian | ................ | H02N 2/18 |
| 2003/0094861 A1* | 5/2003 | Shimizu | ................ | H02K 33/10 |
| | | | | 310/36 |
| 2005/0140219 A1* | 6/2005 | Sanematsu | ............. | H02K 33/16 |
| | | | | 310/15 |
| 2008/0307654 A1* | 12/2008 | Motohashi | ............ | B26B 19/282 |
| | | | | 30/45 |
| 2012/0150291 A1* | 6/2012 | Aber | ................... | A61M 60/873 |
| | | | | 623/3.14 |
| 2016/0000543 A1* | 1/2016 | Kobayashi | ......... | A61C 17/3481 |
| | | | | 15/22.1 |
| 2020/0188221 A1* | 6/2020 | Lenke | .................... | A61H 9/005 |
| 2020/0360123 A1* | 11/2020 | Li | ......................... | H02K 7/145 |

* cited by examiner

ND AN OSCILLATING
MAGNETOMETRIC TRANSMISSION STRUCTURE AND AN OSCILLATING DEVICE WITH PRESSURE CHAMBER

CROSS-REFERENCE TO RELATED APPLICATIONS

The present application claims priority under 35 USC 119 from Chinese patent application No. 2023203545090, filed Feb. 28, 2023, the entire contents of which are incorporated herein by reference.

FIELD OF THE INVENTION

The present disclosure generally relates to the field of oscillating devices, in particular to a magnetometric transmission structure and oscillating device.

BACKGROUND OF THE INVENTION

An oscillating device is a type of equipment that utilizes an electric motor to generate oscillation. Typically, an eccentric wheel is installed at the drive end of the motor. During the operation of the electric motor, the centrifugal force generated by the rotation of the eccentric wheel causes the entire oscillating device to undergo slight movement, thus generating oscillation. However, traditional oscillating devices that produce oscillation through mechanical structures are prone to friction and collision, easily leading to significant noise during use.

SUMMARY OF THE INVENTION

The present disclosure is directed to a magnetometric transmission structure. Addressing the deficiencies of existing oscillating devices in use in the background technology, the disclosure provides a magnetometric transmission structure and oscillating device that have the advantage of noise reduction, thereby solving the technical problems mentioned in the background technology.

The disclosed magnetometric transmission structure includes a drive unit, including a driving assembly and a transmission assembly. The transmission assembly includes a magnetic component and a connecting component, and the magnetic component is arranged at the drive end of the drive component. The driving assembly drives the magnetic component to rotate, and the connecting component is arranged between the magnetic component and the drive assembly. The oscillating unit includes an oscillating assembly, including a movable component and an oscillating component. The movable component is arranged on one side of the magnetic component, and the oscillating component is arranged on the movable component and made of magnetic material.

According to one embodiment of the present disclosure, the magnetometric transmission structure further includes a housing, which is arranged on the outer side of the driving assembly and the oscillating assembly.

According to one embodiment of the present disclosure, the oscillating device includes the magnetometric transmission structure and a pressure component, which is connected to the movable component. The pressure component extends in a direction away from the magnetic component and forms a pressure chamber, with one end of the movable component sealing the pressure chamber.

According to one embodiment of the present disclosure, the oscillating unit further includes a disassembly assembly, the disassembly assembly including a spacer plate. The spacer plate is arranged between the magnetic component and the oscillating assembly and configured to assemble the oscillating assembly.

According to one embodiment of the present disclosure, the disassembly assembly further includes an adjustment component. The adjustment component is arranged between the spacer plate and the oscillating assembly, and the adjustment component is used to adjust the assembling depth of the oscillating assembly.

According to one embodiment of the present disclosure, the inner cavity of the spacer plate is configured with a limiting component on the circular side, and the adjustment component is configured with a limiting slot on the circular side.

According to one embodiment of the present disclosure, the inner cavity of the spacer plate is configured with disassembly slots, and the inner cavity of the spacer plate is used to guide the adjustment component separation. The number of limiting components is at least two, and all are arranged in the disassembly slot, with different heights.

According to one embodiment of the present disclosure, the number of limiting slots is at least two, and the limiting slots are arranged along the length direction of the oscillating component.

According to one embodiment of the present disclosure, an oscillating device includes the magnetometric transmission structure, with at least two magnetic components and the drive end of the drive component being eccentrically connected to the connecting component.

According to one embodiment of the present disclosure, the oscillating device comprises the magnetometric transmission structure, with four oscillating components arranged at equal angles around the center point of the magnetic component.

One beneficial effect of this application is that, by setting a magnetic component and an oscillating component made of magnetic material, the magnetic component can be driven to rotate synchronously with the connecting component when the driving assembly drives the transmission assembly to rotate. The oscillating component is arranged on one side of the magnetic component, and the magnetic pole of the magnetic component near the end of the oscillating component continuously changes, causing a magnetic attraction or repulsion force on the oscillating component, thereby driving the movable component to move close to and away from the magnetic component and produce oscillation. Using magnetic force for transmission reduces the friction and collision produced by mechanical transmission and reduces noise generation.

BRIEF DESCRIPTION OF DRAWINGS

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. The drawings referred to in this description are not to be understood as being drawn to scale except if specifically noted, and such drawings are only exemplary in nature.

DETAILED DESCRIPTION OF THE INVENTION

Figure 1:
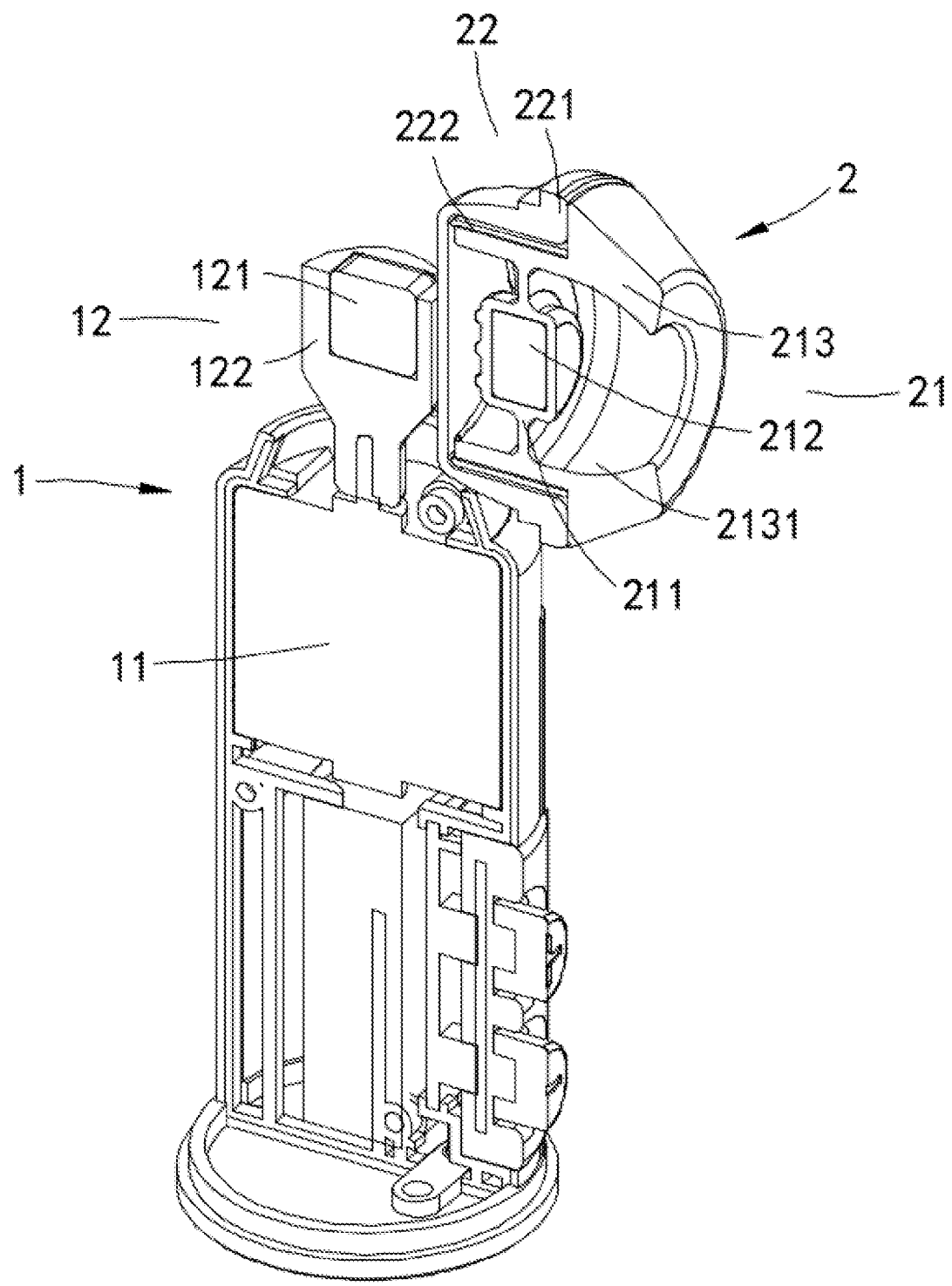
FIG. 1 is a structural schematic diagram of a magnetometric transmission structure in one embodiment.

The following will disclose multiple embodiments of the present disclosure in a diagrammatic form. For clarity's sake, many practical details will be explained in the following description. However, it should be understood that these practical details should not be used to limit the present disclosure. That is to say, in some embodiments of the following description, the practical details are not necessary. Additionally, for the sake of simplifying the diagrams, some commonly used structures and components will be depicted in a simple and schematic manner.

It should be noted that all directional indications, such as up, down, left, right, front, back, etc., used in the following description are only used to explain the relative positional relationships and movement of the components under a specific posture as shown in the drawings. If this specific posture changes, the directional indications will change accordingly.

Furthermore, in the following description, if there are depictions such as "first," "second," etc., they are only used to describe the purpose and do not specifically refer to order or priority, nor are they used to limit the present disclosure. They are only used to distinguish components or operations described in the same technical language and cannot be understood as indicating or implying the relative importance or the number of technical features indicated. Therefore, reference in this description to "first" or "second" can include at least one such feature, either explicitly or implicitly. Additionally, the technical solutions of each embodiment can be combined with each other, but it must be based on what ordinary skilled persons in the field can achieve. When the combination of technical solutions is contradictory or cannot be realized, it should be considered that the combination of such technical solutions does not exist.

To further understand the content, characteristics, and effects of the present disclosure, the following embodiments are provided with detailed explanations and accompanying drawings:

Various example embodiments of present disclosure are described hereinafter with reference to FIGS. 1-10.

Figure 2:
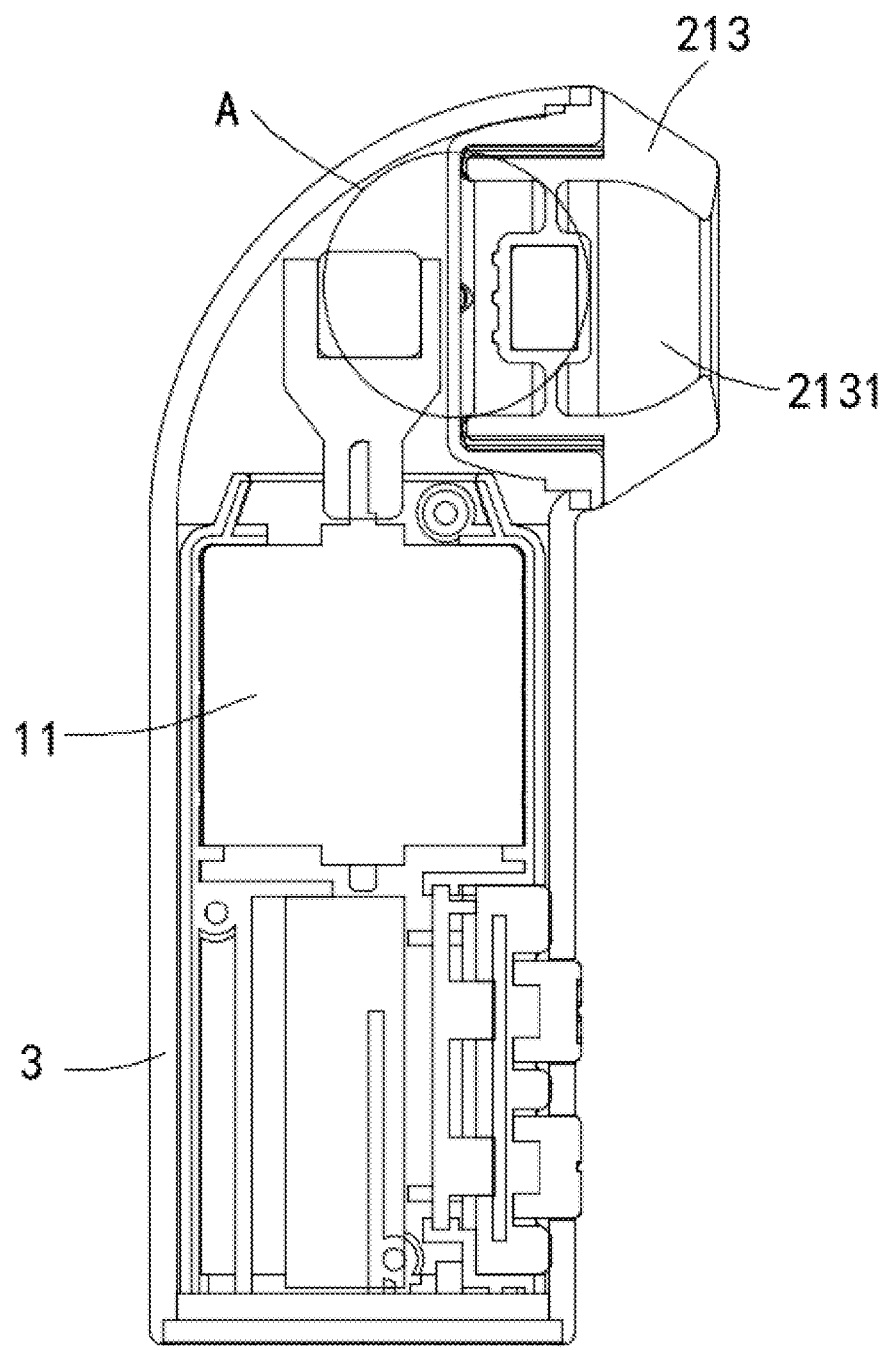
FIG. 2 is a structural schematic diagram of a magnetometric transmission structure in another embodiment.

In an embodiment, referring to FIG. 1 and FIG. 2, FIG. 1 is a schematic diagram of one of the structural embodiments of the magnetometric transmission structure in this embodiment, and FIG. 2 is a schematic diagram of one of the structural embodiments of the magnetometric transmission structure in this embodiment. A magnetometric transmission structure includes a driving unit 1 and an oscillating unit 2. The driving unit 1 includes a driving assembly 11 and a transmission assembly 12. The transmission assembly 12 includes a magnetic component 121 and a connecting component 122. The magnetic component 121 is arranged to the driving end of the driving assembly 11, and the driving assembly 11 drives the magnetic component 121 to rotate. The magnetic pole direction of magnetic attraction piece 121 is perpendicular to the extending direction of the driving end of the driving assembly 11, so that the magnetic pole direction can continuously change during the rotation of the magnetic component 121. The connecting component 122 is arranged between the magnetic component 121 and the driving assembly 11, so that the different number of the magnetic components 121 or the eccentrically placed magnetic components 121 can be arranged according to the needs, to change the strength of the magnetic attraction force that the magnetic component 121 can generate. The oscillating unit 2 includes an oscillating assembly 21, which includes a movable component 211 and an oscillating component 212. The movable component 211 is arranged on one side of the magnetic component 121, and the oscillating component 212 is arranged on the movable component 211. The oscillating component 212 is made of magnetic material, so that when the driving assembly 11 drives the magnetic component 121 to rotate, a force that makes the oscillating component 212 move closer or further away from the magnetic component 121 can be applied through the magnetic attraction force or magnetic repulsion force, thereby driving the movable component 211 to move and generating oscillation. Through the magnetometric transmission, the driving unit 1 and the oscillating unit 2 can transmit without contact, avoiding the friction and collision caused by traditional mechanical transmission, thereby avoiding the occurrence of significant noise that affects normal use.

A magnetometric transmission structure further includes a housing 3, which is arranged on the outside of the driving assembly 11 and the oscillating assembly 21, so that the driving unit 1 and the oscillating unit 2 can be arranged in the housing 3, thereby ensuring the stability of the magnetometric transmission structure and further ensuring that the driving unit 1 and the oscillating unit 2 are separated, thereby avoiding the generation of noise.

Figure 3:
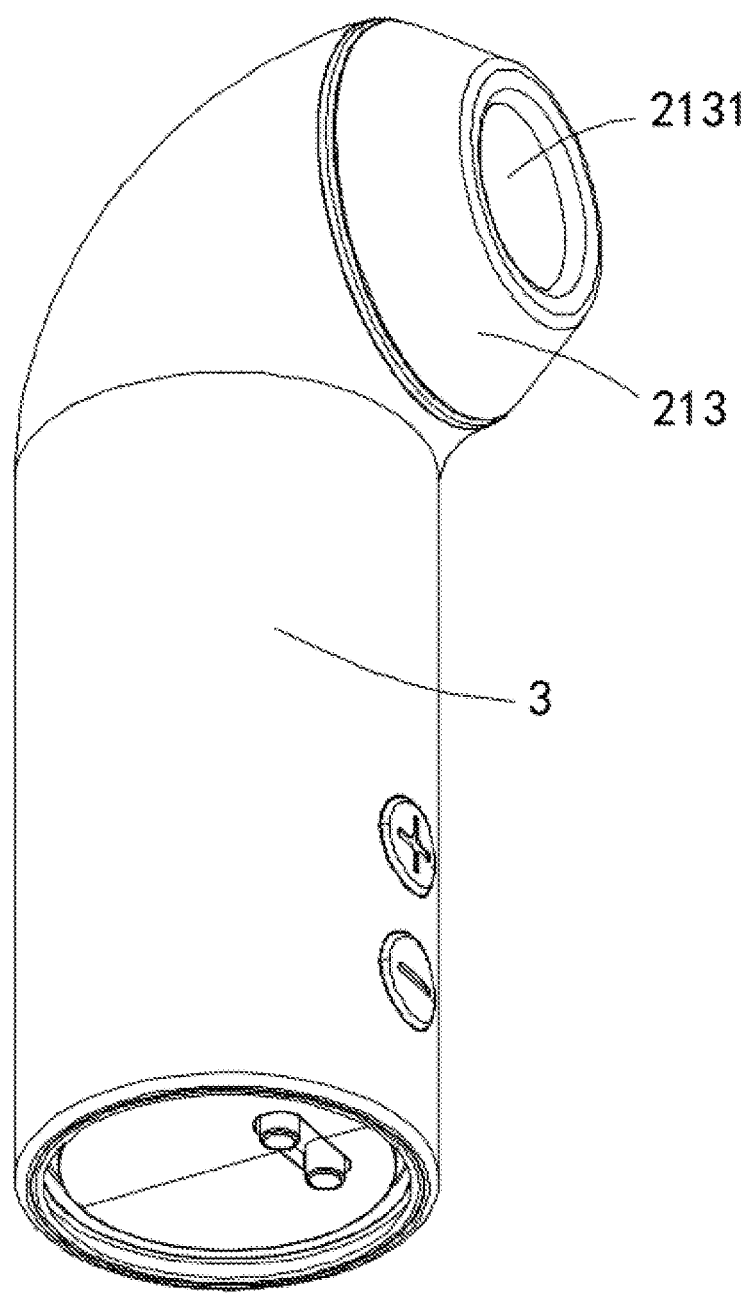
FIG. 3 is a structural schematic diagram of an oscillating device in one embodiment.
Figure 4:
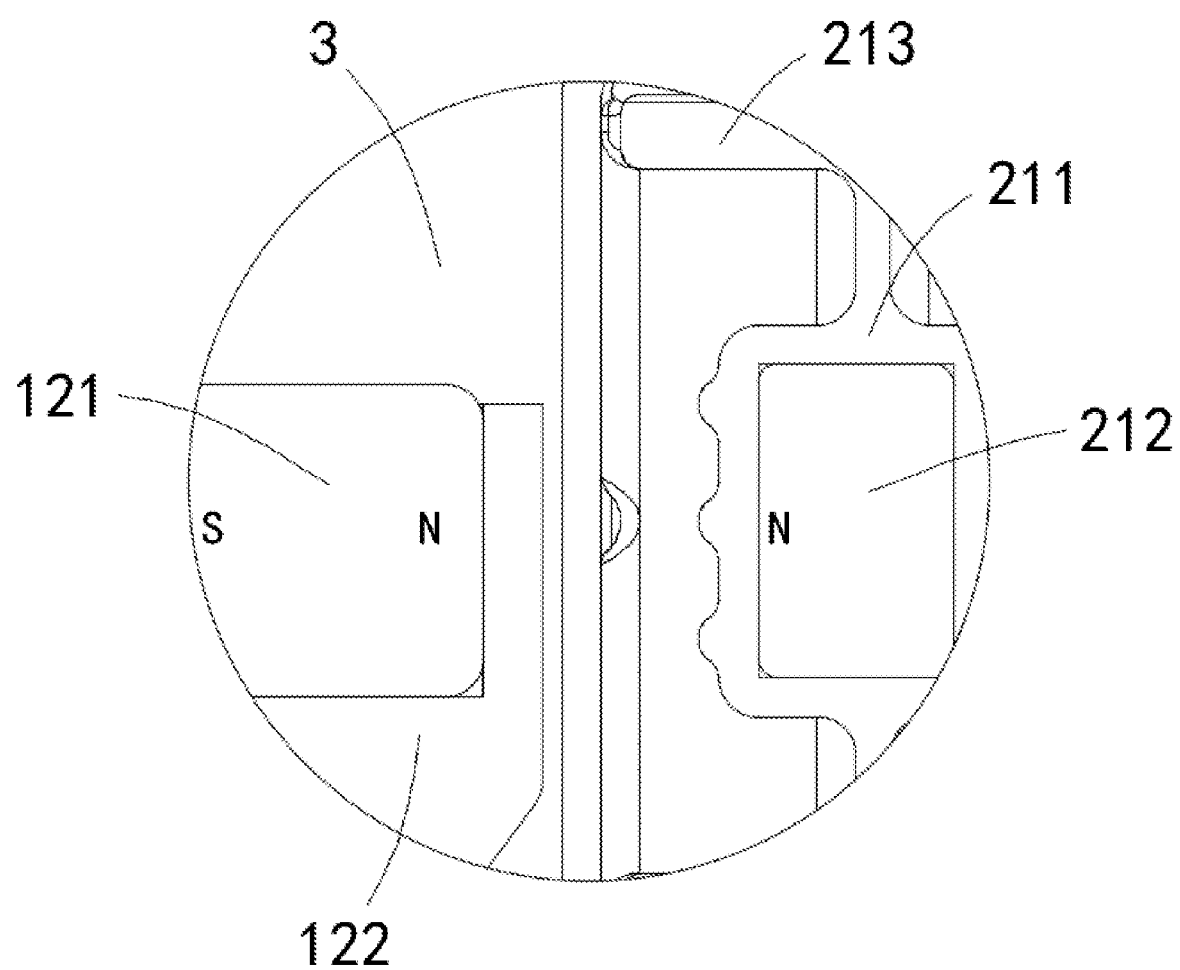
FIG. 4 is an enlarged schematic diagram of the structure at location A in FIG. 2.

In an embodiment, referring to FIGS. 3 and 4, FIG. 3 is a schematic diagram of one of the oscillating device structures in the embodiment; FIG. 4 is an enlarged schematic diagram of the structure at position A in FIG. 2. The oscillating device includes the above mentioned magnetometric transmission structure, and the oscillating assembly 21 also includes a pressure component 213, which is connected to the movable component 211. The pressure component 213 extends in the direction away from the magnetic component 121 and forms a pressure chamber 2131. The movable component 211 closes one end of the pressure chamber 2131, so that when oscillation is generated, the pressure component 213 can be docked with the desired location, and the pressure chamber 2131 can be closed. Under the action of the magnetometric transmission structure, the oscillating component 212 drives the movable component 211 to move, and when the oscillating component 212 approaches the magnetic component 121, the volume of the pressure chamber 2131 increases, thus forming a negative pressure chamber that creates suction at the opening of the pressure chamber 2131. When the oscillating component 212 moves away from the magnetic component 121, the volume of the pressure chamber 2131 decreases, and the internal pressure increases, creating blow on the opening of the pressure chamber 2131. Under the rotation of the magnetic component 121, the pressure chamber 2131 circulates between negative pressure and positive pressure.

Figure 5:
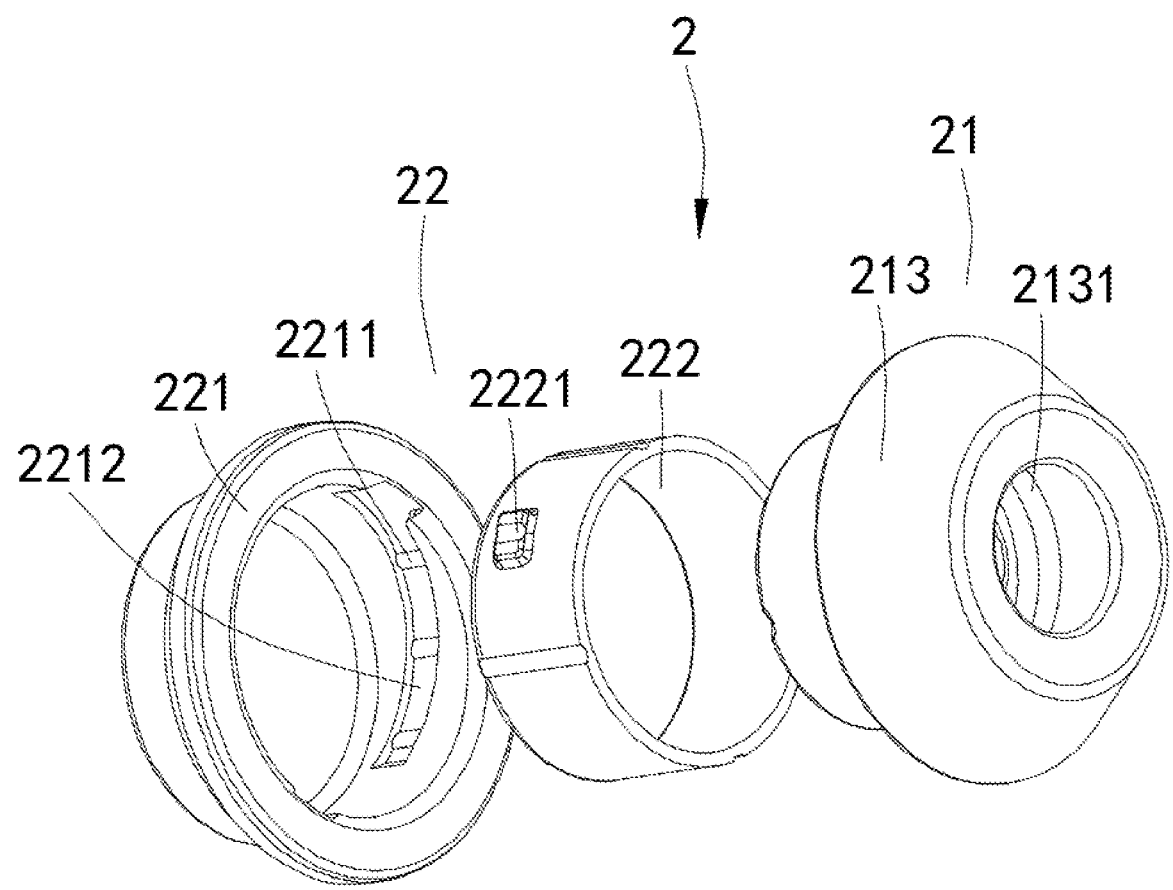
FIG. 5 is a structural schematic diagram of the oscillation section in the embodiment.
Figure 6:
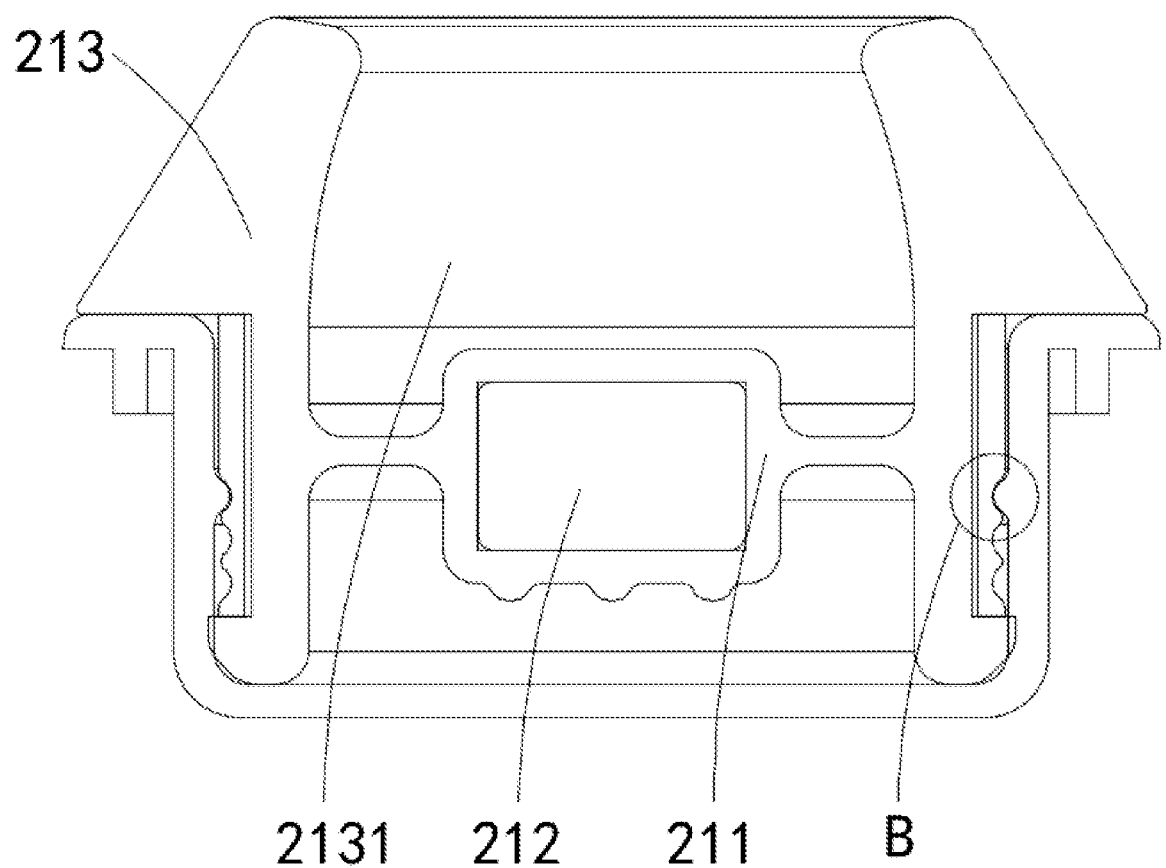
FIG. 6 is a structural schematic diagram of the oscillating assembly in the embodiment.
Figure 7:
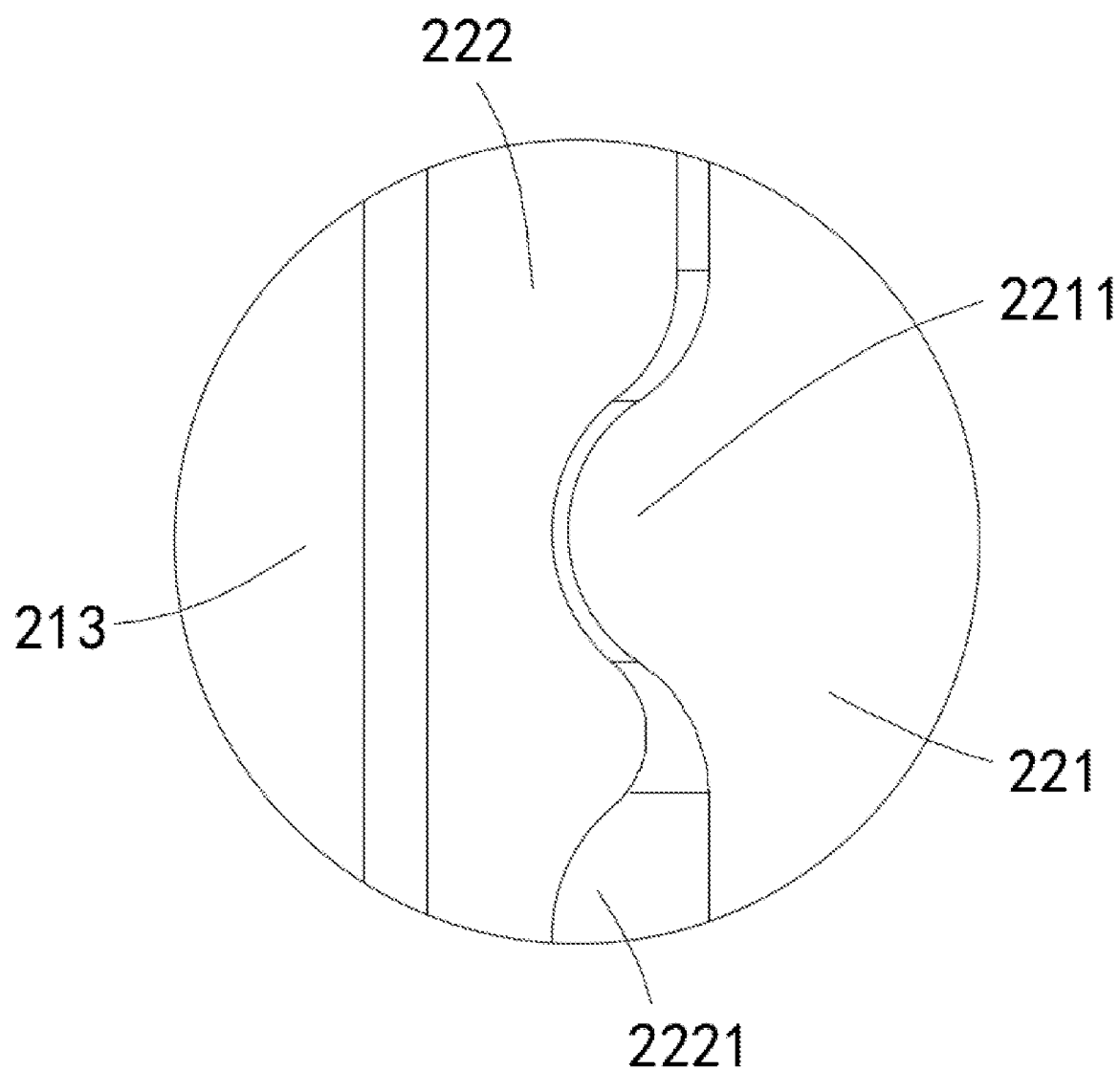
FIG. 7 is an enlarged schematic diagram of the structure at location B in FIG. 6.
Figure 8:
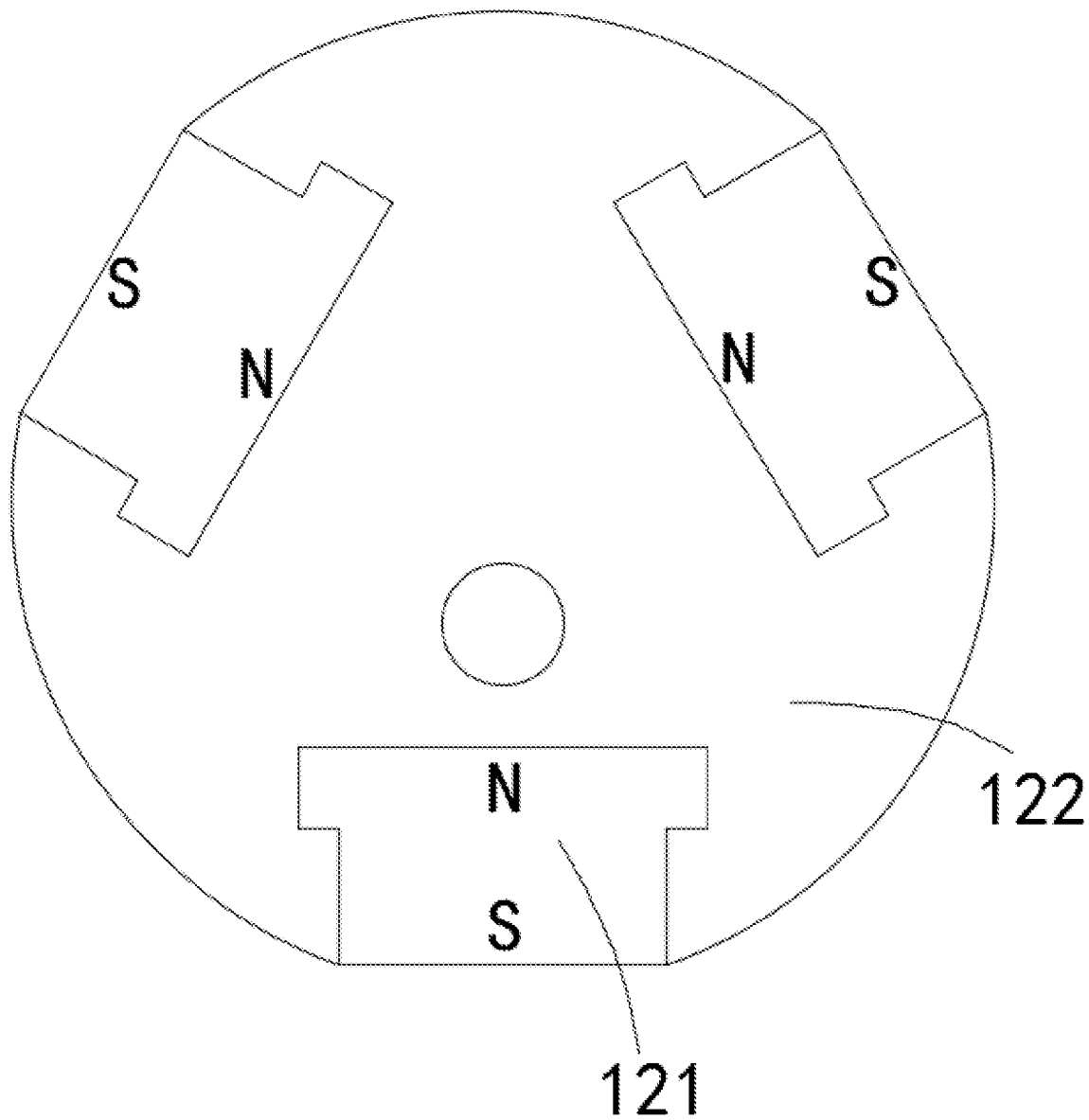
FIG. 8 is a structural schematic diagram of the transmission component in the embodiment.
Figure 9:
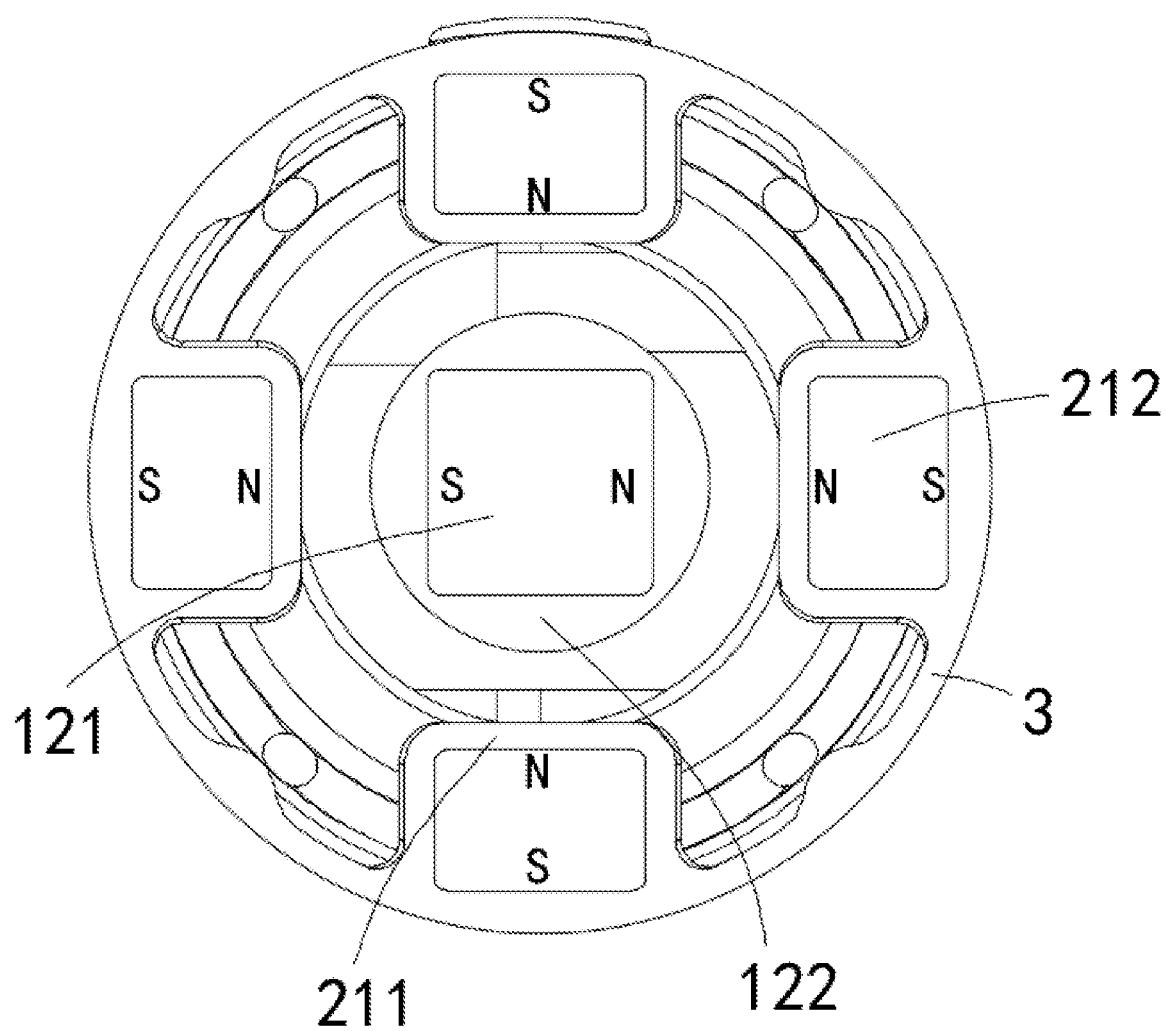
FIG. 9 is a structural schematic diagram of the oscillating device in another embodiment.

Referring to FIGS. 5-7, FIG. 5 is a schematic diagram of the structure of the oscillating unit in the embodiment; FIG. 6 is a schematic diagram of the structure of the oscillating component in the embodiment; and FIG. 7 is an enlarged schematic diagram of the structure at position B in FIG. 6. The oscillating unit 2 also includes a disassembly assembly 22, which includes a spacer plate 221, which is arranged between the magnetic component 121 and the oscillating assembly 2, in avoidance of an undesired adhesion therebetween. Thereby it is convenient to arrange the assembly 21 isolating the oscillating assembly 21 from the driving unit 1. And it can also dismantle the oscillating assembly 21 for easy cleaning, and it will not cause water to enter the housing 3 during the cleaning of the oscillating assembly 21, avoiding the result of the inability of the driving unit 1 to work properly.

The disassembly component 22 also includes an adjustment component 222, which is arranged between the spacer plate 221 and the oscillating assembly 21 and is used to adjust the assembling depth of the oscillating assembly 21.

The circular side of the inner cavity of the spacer plate 221 is configured with limiting components 2211, and the circular side of the adjustment component 222 is configured with limiting slots 2221, so that the assembling depth of the oscillating assembly 21 in the spacer plate 221 can be adjusted by the cooperation of the limiting components 2211 and the limiting slots 2221, thereby adjusting the distance between the magnetic component 121 and the oscillating component 212 and changing the magnetic attraction force or magnetic repulsion force acting on the oscillating component 212 to adjust the oscillation intensity.

Specifically, the inner cavity of the spacer plate 221 is configured with a disassembly slot 2212, and the adjustment component 222 is guided to separate and at least two limiting components 2211 are arranged in the disassembly slot 2212, with different heights, so that the oscillation generated by the oscillating assembly 21 can be adjusted in multiple steps.

Preferably, the limiting components 2211 are inclined, and a protrusion that extends into the disassembly slot 2212 is arranged at the limiting slot 2221 of the adjustment component 222, so that when the adjustment component 222 with the oscillating assembly 21 is installed in the spacer plate 221 by rotating along the disassembly slot 2212, the two are connected and fastened, and the oscillation can be adjusted in multiple steps according to multiple limiting components 2211.

In an embodiment, referring to FIGS. 6 and 7, the number of limiting slots 2221 is at least two and the limiting slots 2221 are arranged along the length direction of the oscillating assembly 21. This allows the oscillating assembly 21 to be installed in the spacer plate 221 by directly pressing the adjustment component 222 into the spacer plate 221. The multiple limiting slots 2221 can be used with the limiting components 2211 to adjust the oscillation intensity in multiple steps, making the operation simple and improving the adjustment efficiency.

In an embodiment, referring to FIGS. 3-8, FIG. 8 is a schematic diagram of the transmission component in the embodiment. The oscillating device includes the above mentioned magnetometric transmission structure, and the number of magnetic components 121 is at least two. The magnetic components 121 are arranged at equal angles around the center point of the connecting component 122. The driving assembly 11 is eccentrically connected to the connecting component 122, so that when the connecting component 122 rotates, multiple magnetic components 121 can be driven to rotate synchronously, thereby generating magnetic attraction force on the oscillating component 212 at different distances. This causes the oscillating component 212 to vibrate multiple times at different amplitudes, achieving the effect of band oscillation.

Specifically, when using the device, the magnetic components 121 can also be driven to generate the same effect by magnetic repulsion with the oscillating component 212.

Furthermore, multiple magnetic components 121 can be arranged on the same side of the connecting component 122, leaving a large area on the connecting component 122 that does not generate magnetic force on the oscillating component 212. When the connecting component 122 rotates, multiple magnetic components 121 can one by one to generate magnetic attraction or repulsion on the oscillating component 212, causing the oscillating component 212 to gradually move closer or farther away from the magnetic components 121. When the end of the oscillating component 212 which is no magnetic components 121 are set on, the oscillating component 212 can automatically reset under the elastic force of the movable component 211, so that the oscillating device can vibrate with a larger amplitude, improving the oscillation effect of the oscillating device.

Figure 10:
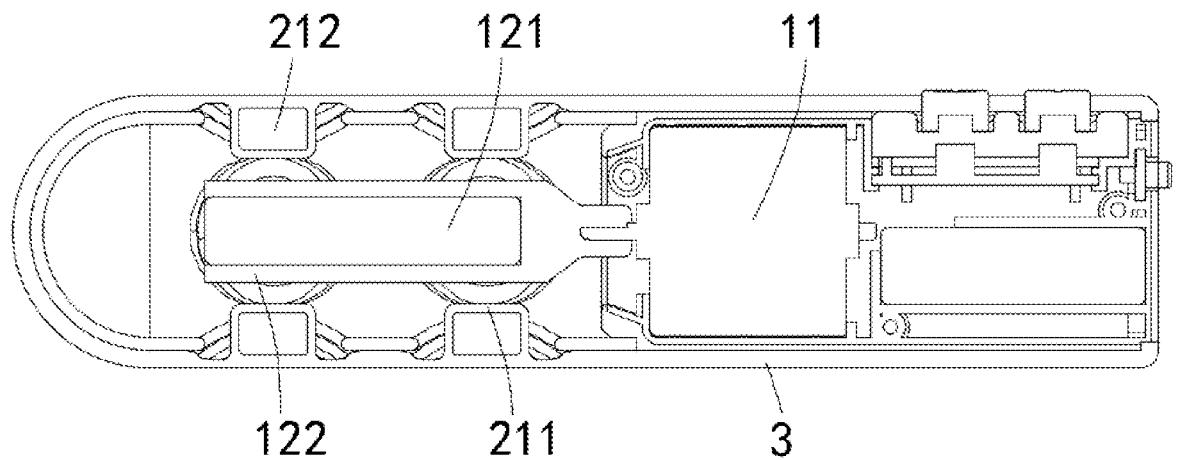
FIG. 10 is a structural schematic diagram of the oscillating device in another embodiment.

In an embodiment, referring to FIGS. 1, 2, 9 and 10, FIG. 9 is a schematic diagram of the oscillating device in the embodiment, and FIG. 10 also is a schematic diagram of the oscillating device in the embodiment. The oscillating device includes the above mentioned magnetometric transmission structure. the number of the oscillating component 212 is four, and they are arranged at equal angles around the center point of the magnetic component 121, and the magnetic poles of the oscillating component 212 close to the magnetic component 121 are the same. When the magnetic components 121 rotate under the driving of the driving component 11, they can generate magnetic attraction or repulsion on the oscillating component 212, thereby driving the movable component 211 to move and generate oscillation.

There are two sets of oscillating component 21 arranged along the extension direction of the magnetic components 121, so that when one magnetic component 121 rotates under the driving of the driving assembly 11, multiple sets of oscillating assembly 21 can vibrate simultaneously, and the oscillations superimpose to enhance the oscillation ability of the oscillating device.

Specifically, the housing 3 is wrapped around the outside of the entire magnetometric transmission structure, so that when the magnetometric transmission structure works, one end of the housing 3 can vibrate.

In summary, by setting the magnetic component and the oscillating component made of magnetic materials, when the transmission components are driven to rotate by the driving component, the magnetic components can rotate synchronously under the action of the connecting component. By setting the oscillating component on one side of the magnetic components, the magnetic poles on one end of the oscillation piece close to the magnetic components can constantly change, thereby generating magnetic attraction or repulsion on the oscillating component, driving the moving component to move back and forth, and generating oscillation. Using magnetic force for transmission reduces friction and collisions that occur in mechanical transmission, thereby reducing noise.

The above description is only an embodiment of the specific features and acts described above and is not intended to limit the specific features or acts described above. Various modifications and changes can be made by those skilled in the art. All modifications, equivalent replacements, improvements, etc. made within the spirit and principles of the specific features and acts described above should be included within the scope of implementing the claims.

The invention claimed is:

1. An oscillating device, comprising:
   a driving unit, comprising a driving assembly and a transmission assembly, wherein the transmission assembly comprises a magnetic component and a connecting component, the magnetic component being arranged at a driving end of the driving assembly, and driven by the driving assembly to rotate, and the connecting component being arranged between the magnetic component and the driving assembly;
   an oscillating unit, comprising an oscillating assembly, wherein the oscillating assembly comprises a movable component and oscillating component, the movable component being arranged at one side of the magnetic component, the oscillating component being arranged at the movable component, and the oscillating component being made of magnetic material; and
   wherein the oscillating component comprises a pressure component, the pressure component being configured to connect to the movable component, extending in a direction away from the magnetic component, forming a pressure chamber, and the movable component sealing one end of the pressure chamber.

2. The oscillating device of claim 1, wherein the oscillating unit comprises a disassembly component, the disassembly component comprising a spacer, the spacer being arranged between the magnetic component and the oscillating component, and configured to assemble the oscillating assembly.

3. The oscillating device of claim 2, wherein the disassembly assembly further comprises an adjustment component, the adjustment component being arranged between the spacer plate and the oscillating assembly, and configured to adjust an assembling depth of the oscillating assembly.

4. The oscillating device of claim 3, wherein a circumferential side of an inner cavity of the spacer plate is configured with a limiting component, and the circumferential side of the adjustment component is configured with a limiting slot.

5. The oscillating device of claim 4, wherein the inner cavity of the spacer plate is configured with a disassembly slot for guiding a separation of the adjustment component, a number of the limiting components being at least two, and the limiting components being arranged in the disassembly slot at different heights.

6. The oscillating device of claim 5, wherein a number of the magnetic components is at least two, and the driving end of the driving assembly is eccentrically connected to the connecting component.

7. The oscillating device of claim 4, wherein a number of the limiting slots is at least two, and the limiting slots are arranged along a longitudinal direction of the oscillating assembly.

8. The oscillating device of claim 7, wherein a number of the magnetic components is at least two, and the driving end of the driving assembly is eccentrically connected to the connecting component.

9. The oscillating device of claim 1, wherein a number of the magnetic components is at least two, and the driving end of the driving assembly is eccentrically connected to the connecting component.

* * * * *